United States Patent [19]

Kamura

[11] Patent Number: 5,640,443
[45] Date of Patent: Jun. 17, 1997

[54] MOVABLE TELEPHONE COMMUNICATION SYSTEM

[75] Inventor: Takeshi Kamura, Kawasaki, Japan

[73] Assignee: Fujitsu Limited, Kanagawa, Japan

[21] Appl. No.: 208,439

[22] Filed: Mar. 9, 1994

[30] Foreign Application Priority Data

May 11, 1993 [JP] Japan ..................... 5-132902

[51] Int. Cl.$^6$ .................................. H04Q 7/22
[52] U.S. Cl. .................. 379/59; 379/60; 358/442
[58] Field of Search .................. 379/59, 60, 63, 379/58; 455/33.1, 33.2, 56.1, 34.1, 17; 370/31; 340/825.03; 358/442

[56] References Cited

U.S. PATENT DOCUMENTS

| | | | |
|---|---|---|---|
| 5,265,263 | 11/1993 | Ramsdale et al. | 379/60 |
| 5,377,185 | 12/1994 | Bardusk | 379/63 |
| 5,384,824 | 1/1995 | Alvesalo | 379/59 |
| 5,506,837 | 4/1996 | Söllner et al. | 379/60 |
| 5,512,884 | 4/1996 | Hesse et al. | 379/60 |

*Primary Examiner*—Kim Vu
*Assistant Examiner*—Fan Lee

[57] ABSTRACT

In a mobile telephone communication system which performs telephone communications with a group including mobile subscribers to improve the rate of receiving telephone calls and quality of communication, the plurality of mobile subscribers each sends out information including a location number and a subscriber telephone number. A mobile switch center receives information from each mobile subscriber via a corresponding one of radio base stations and performs control of the calls from the mobile subscribers. The mobile switch center has a subscriber data table that stores a group indication which indicates the mobile subscribers of the group and a group number corresponding to the group as subscriber data, and performs, upon the occurrence of the registration of changing the state of one mobile subscriber, the same registration of changing the state (idle or busy) for all remaining mobile subscribers in the group, referring to the group indication and the group number sent from the one mobile subscriber.

17 Claims, 8 Drawing Sheets

FIG. 3A

Indexed from
the subscriber telephone number →

SUBSCRIBER DATA

| P | G. No. | L I | L M | } GROUP |
| C | G. No. | L I | L M | |
| C | G. No. | L I | L M | |

↓ Group Indication Y
↑ Group Number

P : Master Telephone

C : Subordinate Telephone

FIG. 3B

Indexed from
the subscriber telephone number →

SUBSCRIBER DATA

| P | G. No. | L I | L M | } GROUP |
| C | G. No. | / | L M | |
| C | G. No. | / | L M | |

↓ Group Indication Y
↑ Group Number

P : Master Telephone

C : Subordinate Telephone

FIG. 7
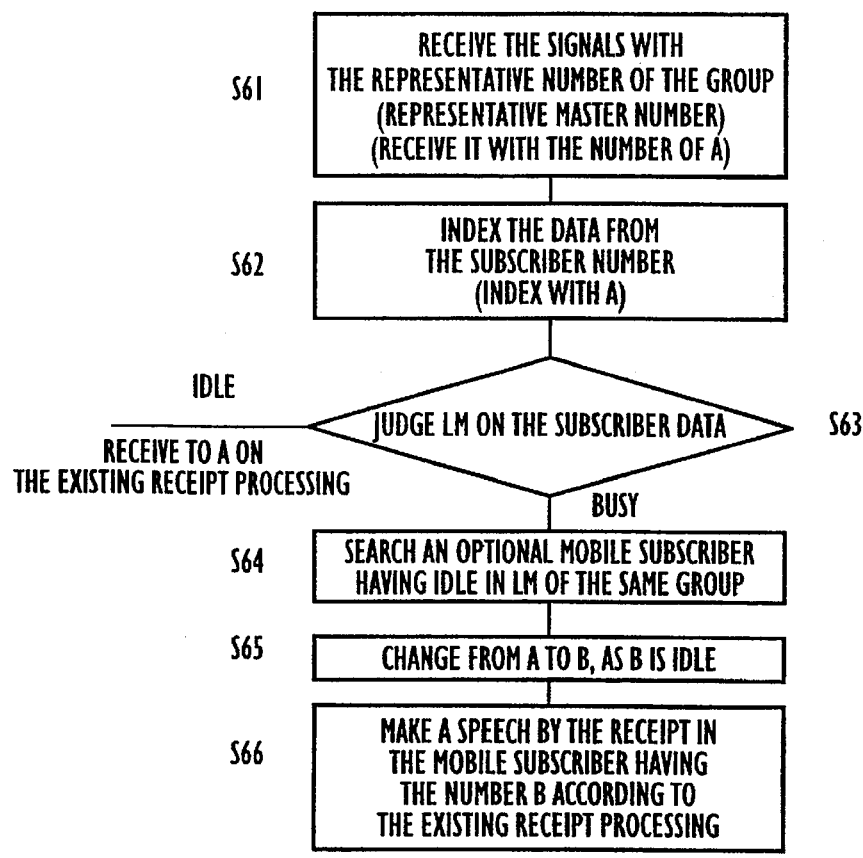
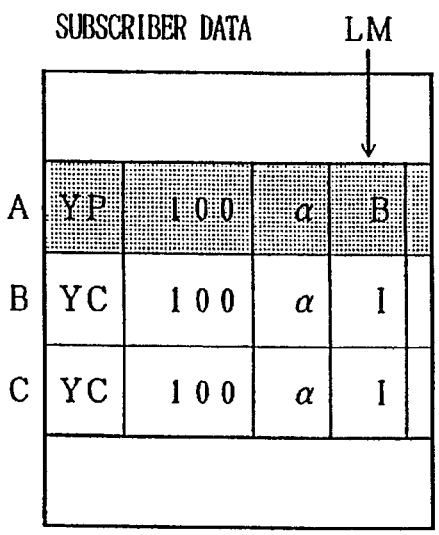
FIG. 8A
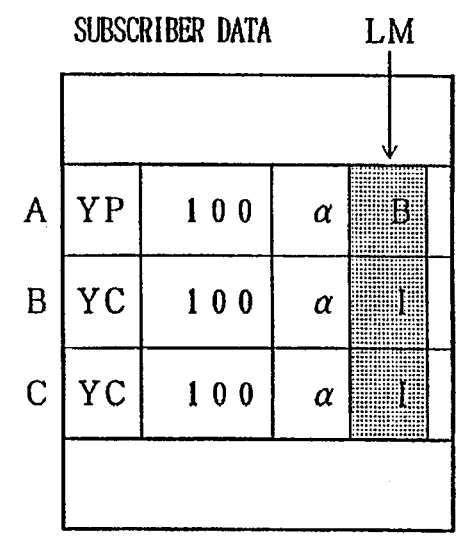
FIG. 8B

SUBSCRIBER DATA

| A | YP | 100 | α | B |
|---|----|-----|---|---|
| B | YC | 100 | α | I |
| C | YC | 100 | α | B |

| A | YP | 100 | β | B |
|---|----|-----|---|---|
| B | YC | 100 | β | I |
| C | YC | 100 | β | B |

MOVABLE TELEPHONE COMMUNICATION SYSTEM

BACKGROUND OF THE INVENTION

1. Field of the Invention

The present invention relates to a mobile telephone communication system. More particularly, it relates to a mobile telephone communication system for performing communication with a group constituted of plural mobile telephones.

2. Description of Prior Art

Recently, the demands for the mobile telephone have been known and the situations in using the mobile telephones have been diversified. Accordingly, it is required to provide a communication system, which can meet these demands and situations.

In the case where the public telephone network can not be used, for example, in a search for a mountaineering disaster, rescue operation and operation for collecting data on a fire scene, and the like, there are situations where the mobile telephone is used for contact and report.

In these cases, many people have mobile telephones and rescue operations and operations for collecting data, and the like, are performed by a group of people. Further, as special characteristics, there are some cases where the group operates in an area which is not very large and all of the constituent members move to the same area as a group.

Some mobile telephones owned by the group are usually allocated one subscriber number to one subscriber. Accordingly, it is required to perform a calling to any one of the mobile telephones owned by the subscribers who are constituent members, even if a calling is made to contact and notify the group.

However, when a called subscriber is busy, it is impossible for the subscriber to receive the call. Accordingly, it becomes difficult to contact and notify the group. More particularly, it becomes extremely important to receive the call effectively, in a case demanding immediate attention, for example, a rescue operation, operation for collecting data, and the like.

It is also inefficient to repeat the call sequentially until it becomes possible to be received by a mobile telephone held by any one of the subscribers who are constituent members of the group, from the view point of efficiency and immediate attention.

SUMMARY OF THE INVENTION

Accordingly, it is an object of the present invention to provide a mobile telephone communication system, in which the rate of receiving is improved, compared to the conventional mobile telephone communication system.

It is a further object of the present invention to provide a mobile telephone communication system, in which a high communication quality is obtained, compared to the conventional mobile telephone communication system.

It is a still further object of the present invention to provide a mobile telephone communication system, in which plural subscribers constituting a group, and any subscriber of the group may be called according to dialling with a representative number.

It is a further object of the present invention to provide a mobile telephone communication system, in which plural subscribers constitute a group, and when a location number of a subscriber in the group is registered, the same location number may be registered for all of the other subscribers in the group.

A mobile telephone communication system according to the present invention may comprise: plural mobile subscribers each sending out information including a location number and a subscriber telephone number; plural radio base stations; and a mobile switch center for receiving information from each subscriber via a corresponding one of the plural radio base stations and performing control for callings from the plural subscribers, said mobile switch center having a subscriber data table that stores a group indication that indicates subscribers constituting a group and a group number corresponding to the group as subscriber data, and performing, upon the occurrence of the registration of changing the status for one mobile subscriber, the same registration of changing the status for all of the remaining subscribers in the group, referring to the group indication and the group number sent from the one subscriber.

Other objects of the present invention will be understood by the detailed description to follow, and in conjunction with the appended claims.

BRIEF DESCRIPTION OF THE DRAWINGS

FIG. 3 is a diagram showing a structural example of subscriber data;

FIG. 5 is a diagram showing one method for registering the location number corresponding to the example of FIG. 4;

FIG. 7 is a flow chart showing one method for a representative receipt according to the present invention;

FIG. 8 is a diagram showing one method for switching a channel according to the present invention;

FIG. 10 is a diagram showing one method for switching the channel corresponding to the example of FIG. 9.

DESCRIPTION OF THE PREFERRED EMBODIMENTS

To understand the present invention better, the communication system applying the present invention and the positioning of the present invention in the system are described before explaining details of the embodiments of the present invention.

Figure 1:
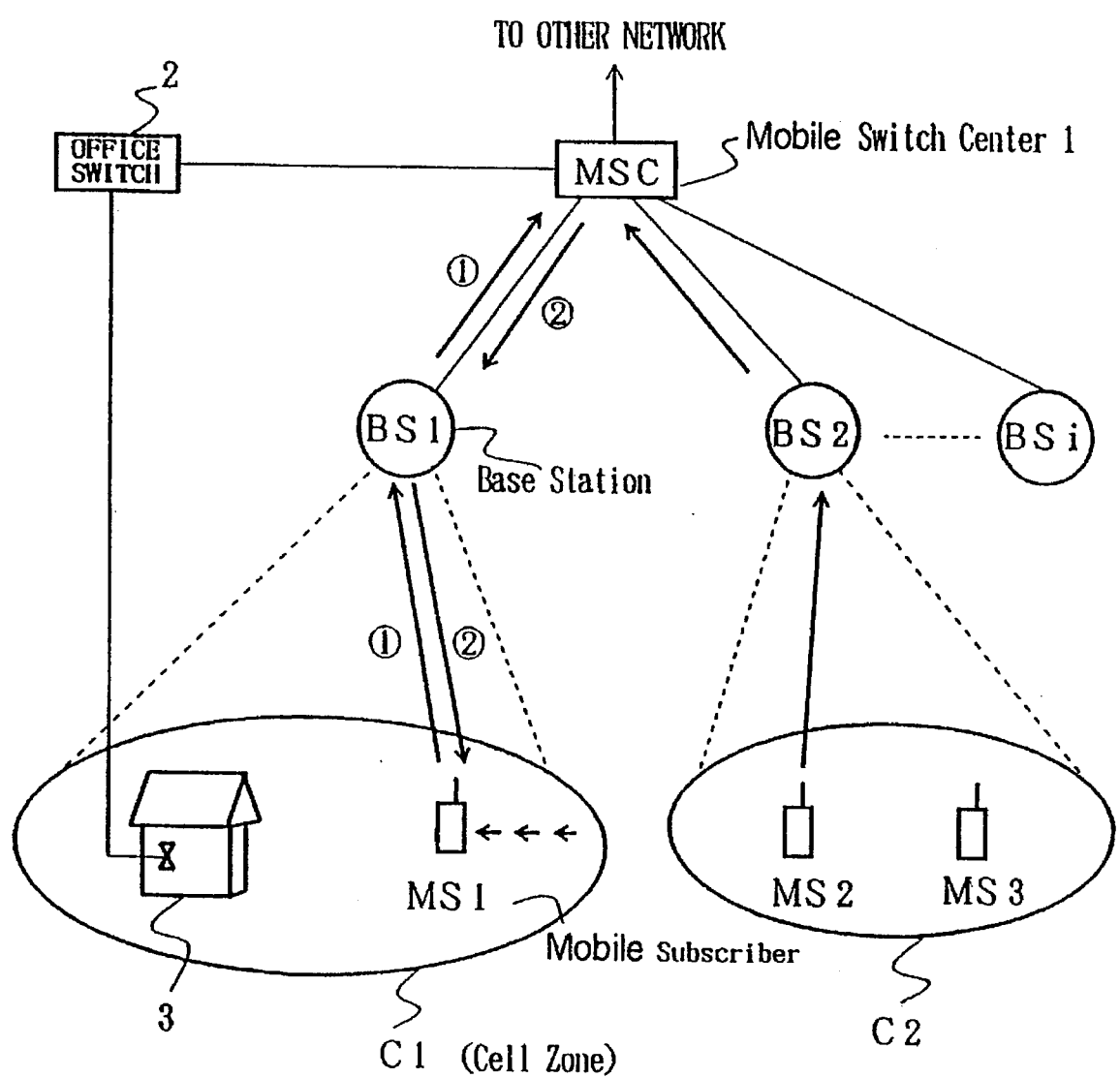
FIG. 1 is an explanatory diagram of the applied mobile telephone communication system according to the present invention.

FIG. 1 is a principle diagram of the mobile telephone communication system. In FIG. 1, numeral "1" is a mobile communication exchanger (MSC), which sends and receives signals to and from a plurality of radio base stations (BS1–BSi). C1 and C2 are cell zones which are communication fields covered by the radio base stations BS1 and BS2, respectively.

MS1, MS2 and MS3 are a plurality of mobile telephones (herein after referred to as a movable subscriber), and these are, for example, an automobile telephone and a portable telephone. In FIG. 1, the mobile subscriber MS1 is in the cell zone C1 covered by the radio base station BS1 and the mobile subscribers MS2 and MS3 are in the cell area C2 covered by the base station BS2.

Numeral "2" shows an office switch of a fixed telephone network. The telephone subscriber 3 in the cell zone C1 is connected to the office switch 2 of the fixed telephone network. Accordingly, the telephone communication between the telephone subscriber 3 in the cell zone C1 and the mobile subscribers MS1, 2 or 3 is performed via the office switch 2, the mobile switch center 1 and the radio base stations BS1~BSi in the corresponding cell zone.

When the mobile subscriber moves and the cell zone having the mobile subscriber is switched, the communication is continued in accordance with switching of the corresponding radio base station. FIG. 1 shows the state of the subscriber MS1 that moved from the cell zone C2 to the cell zone C1. In this case, the radio base station BS2 is switched to BS1, to which the subscriber MS1 transmits signals.

This switching is performed as follows. The radio base stations BS1~BSi always send and receive control signals with the mobile subscribers MS1~MS3, and monitor the condition of radio channels therebetween. The radio base stations BS1~BSi respectively control a mobile subscriber, via the mobile switch center 1, to switch to the radio channel of the radio base station BS1, BS2 or BS3, to which the mobile subscriber moved and the condition of the radio channel becomes better.

The above procedure for the control of switching is the conventional art, which has already been established in a mobile telephone communication system, and the details of the procedure have no relation with the present invention directly.

The present invention registers mobile subscribers as a group in this mobile radio system and improves the rate of completion for receiving calls by the group. To obtain this purpose, the present invention provides a new structure and a control function to the mobile switch center 1.

Figure 2:
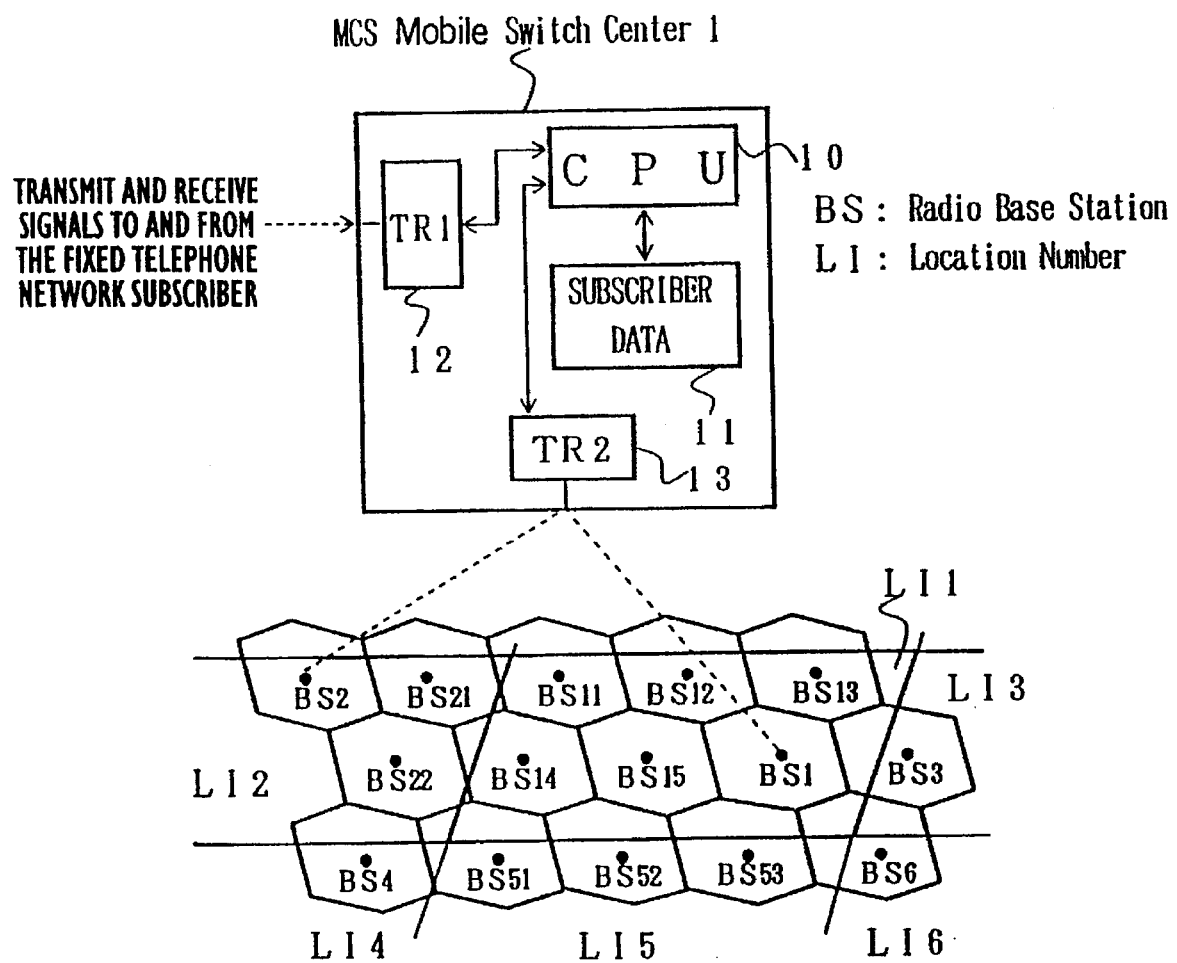
FIG. 2 is a diagram showing one embodiment of the present invention.

FIG. 2 shows the relation between a structure of the mobile switch center 1, which is one embodiment of the present invention, and a plurality of cell zones. A location number is put on each cell field, which is composed of a fixed number of cell zones.

In the example shown in FIG. 2, the cell zones are divided into the cell fields, each having a location number of LI1 through LI6, and the radio base stations BS1 and BS11 through BS15 correspond to the cell field having the location number LI1. Further, the radio base stations BS2, BS21 and BS22 correspond to the cell field having the location number LI2, the radio base station BS3 to the cell field having the location number LI3, the radio base station BS4 to the cell field having the location number LI4, the radio base stations BS51 through BS53 to the cell field having the location number LI5 and the radio base station BS6 corresponds to the cell field having the location number LI6.

The mobile switch center 1 is constructed to have a CPU10, a subscriber data table 11 having fixed address spaces in a memory device such as a ROM, a first trunk device (TR1) 12, which transmits and receives signals to and from the fixed telephone network office switch 2 connected to the fixed network telephone subscriber 3, and a second trunk device (TR2) 13 connected with each radio base station to transmit and receive radio signals thereto and therefrom.

The above structure is the same as that of the conventional system and stores a subscriber telephone number (SBN) and a channel number (CZN) showing which station is connected with per a subscriber on the subscriber data table 11.

Further, as described in the prior art, in the case where the mobile telephone is used for contacting and informing people during a rescue operation, operation for collecting data and the like, people have the mobile telephones which are used for a rescue operation, operation for collecting data and so on. In the present invention, when the mobile telephones constitute a group for use, the subscriber data in relation to the subscriber belonging to the group is provided with the group indication Y and the group number G.NO. In FIG. 3, an example in the case where three subscribers belong to one group is shown. The group indication Y, the group number G.NO and the location number LI, and the information LM showing either busy or idle are stored in the memory for each of the subscribers.

P in the group indication Y indicates the subscriber telephone number which is the representative of a group and C indicates the subscriber telephone number of subordinate on the group. Further, the group indication Y, the group number G.NO. and the location number LI and the idle or busy information LM are indexed from the subscriber telephone number, but it is possible to store by making a group per a group as shown in the diagram and also possible to store by corresponding number per a subscriber telephone number.

Further, (1) in FIG. 3 shows the case where the location number LI is stored in correspondence with each subscriber telephone number of the group, and (2) FIG. 3 shows the case where the location number LI is stored only to the subscriber data having the subscriber telephone number of the representative of the group.

There are often cases where each holder of mobile subscribers in a group operates in an area which is not very far from others and all of the constituent members, that is, all of the mobile subscribers in the group move to the same area as a group at the time for moving, when the subscribers are used for contacting and informing about the rescue operation and operation for collecting data by constituting the group.

In this case, the location number LI for telephone number of each telephone subscriber comprising a group becomes the same for all. Accordingly, in the case (2) of FIG. 3, the location number LI of the subscriber telephone number of subordinate telephone (C) is abbreviated and the location number LI is put only to the subscriber telephone number of the master telephone (P).

Figures 4, 5A, 5B:
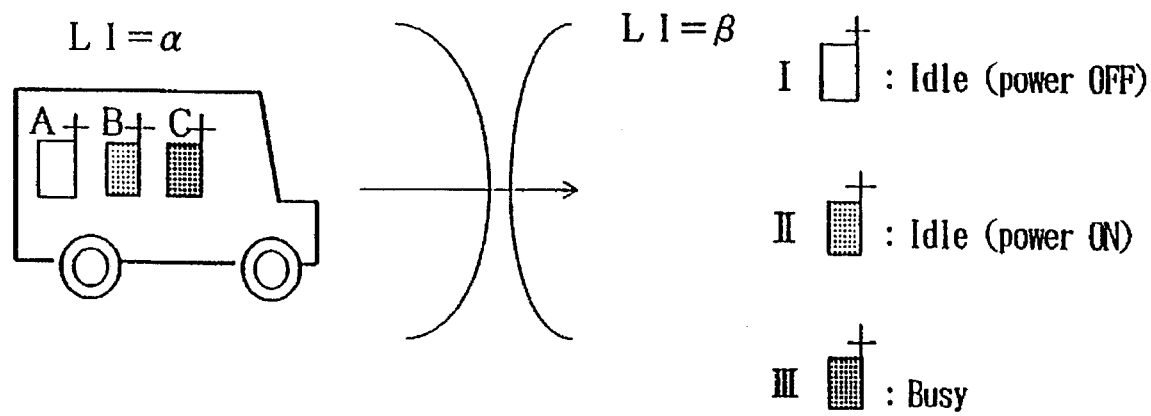
FIG. 4 is a diagram explaining an example in which the registration of a location number is performed according to the present invention.

FIG. 4 is a diagram explaining an example, in which the registration of a location number is performed according to the present invention.

Figure 6:
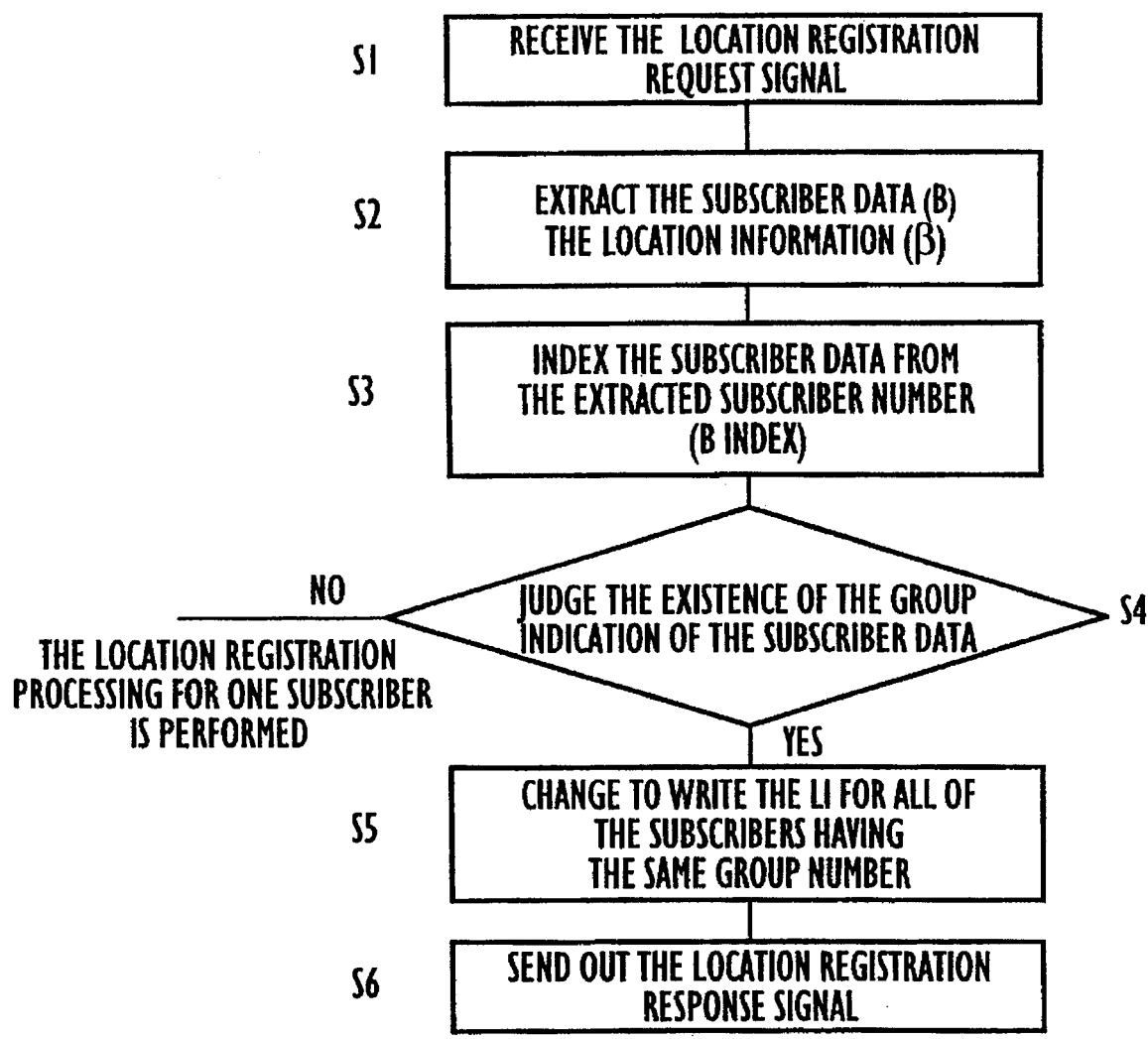
FIG. 6 is a flow chart showing the method for registering the location number corresponding to the method of FIG. 5.

FIG. 5 is a diagram showing a method for the registration of the location number LI on the subscriber data table 11, and FIG. 6 is a processing step flow chart of the method. Same or similar structures and functions are given same reference numerals throughout the specification.

FIG. 4 shows an example in the case where the mobile subscribers A, B and C constituting a group move from the cell field having the location number LI=α to the cell field having the location number LI=β.

Further, the condition I is a power OFF condition of the mobile subscriber and it also means that the telephone subscriber is idle. Further, the condition II is a power ON condition, but it means that the telephone subscriber is idle. The condition III means the mobile subscriber is busy.

FIG. 5, (1) shows the subscriber data table 11 when the mobile subscribers A, B and C constituting a group are located in the cell field having the location number LI=α. The mobile subscriber A is the representative master of the group YP and each of the mobile subscribers B and C is the subordinate YC.

The common group number G.NO is 100 for the mobile subscribers A, B and C. Further, the location number LI is α. The mobile subscribers A and B are in the idle condition I and the mobile subscriber C is in the busy condition B.

(LOCATION REGISTRATION)

When the mobile subscribers A, B and C move from the cell field having the above-described condition to the cell field having the location number LI=β, a location registration is made so that the section of the location number of the subscriber data table 11 is set to the location number LI=β. Here, the location registration is a processing for storing the location number LI as the location information in the subscriber data table 11. Opportunity for performing the location registration processing is in the case where the location information about the mobile subscriber is changed and is set power ON and idle.

That is, in the embodiment of FIGS. 4 through 6, the idle mobile subscriber has the condition of power ON which corresponds to that of the mobile subscriber B. Accordingly, when the subscriber B passes the cell field for changing to the location number LI=β, a location registration request signal ① (refer to FIG. 1) is sent to the mobile communication switch center 1 via the radio base station BS which established the channel.

This location registration request signal ① includes, at least, the subscriber number of the mobile subscriber and the location information as to the cell field covering the radio base station BS that established the channel. Accordingly, the mobile switch center 1 receives this location registration request signal ① through the trunk (TR2) 13 (STEP S1: refer to FIG. 6) and then, the subscriber number (B) and the location information (β) of the mobile subscriber enclosed in the received location registration request signal ① are extracted by CPU 10 (STEP S2).

The subscriber data table 11 as shown in (1) of FIG. 5 is indexed by the extracted subscriber number (B) (STEP S3). Further, the existence of the group indication in the indexed subscriber data table 11 is judged (STEP S4).

In the case where the group indication exists, that the section of group indication is YP or YC, it is understood it is a mobile subscriber of the group. In the case where the group indication does not exist, the location registration processing for one subscriber is performed according to the conventional method.

In the case where the group indication exists, the location number LI is changed to write from α to β for all of the subscribers A, B and C having the same group number 100 (STEP S5) [(2) in FIG. 5].

After being changed to write the location number LI, the location registration response signal ② (see FIG. 1) is sent out to the mobile subscriber MS, thus completing the location registration (STEP S6).

(REPRESENTATIVE RECEIPT)

When a plurality of mobile subscribers constituting a group are mobile telephones used in a rescue operation, there is a case where the fixed telephone network subscriber 3 functions as an instruction station and a necessity occurs for making urgent contact with a group for the rescue operation.

In one case, only one specific mobile telephone of the group is called from the subscriber, in the fixed network 3, which functions as the instruction station, it becomes impossible for the subscriber to make a call until the speech of the specific mobile subscriber is completed in the conventional system, as described above.

The present invention improves receipt efficiency depending on the representative receipt in that case. FIG. 7 is a diagram for explaining a method for representative receipt according to the present invention. FIG. 7 is a processing flow chart of the method of receiving a call. FIGS. 8 is the diagram for explaining the subscriber data table 11 corresponding to the contents of the processing flow shown in FIG. 7. Further, the contents of this processing flow of FIG. 7 is controlled by CPU 10.

On the other hand, as described above, the indication Y showing whether or not the mobile subscriber is a member of the group and the group number G.NO are stored in the subscriber data table 11 at the same time as seen in FIG. 8. When the mobile subscriber constituting the group is called from the subscriber in the fixed network 3, the call signal is sent to the mobile switch center 1 via the fixed network office switch 2 of the present invention.

Then, the subscriber number of the representative master YP of the group is used as the subscriber number of the mobile subscriber to which a calling is intended to send (STEP S61). In the embodiment according to FIGS. 7 and 8, the subscriber number of the representative master of the group is A. Accordingly, the movable switch center 1 indexes the subscriber data corresponding to the subscriber number A on the subscriber data table 11 by CPU 10 (STEP S62).

The data showing that the subscriber is the representative master YP of the group, the group number G.NO is 100, the location number is α and the subscriber is busy (B) are registered in the subscriber data of the mobile subscriber to which the indexed subscriber number A corresponds.

And, LM (showing whether it is idle (I) or busy (B)) on this subscriber data table 11 is judged (STEP S63). When it is idle (I), it becomes possible to communicate with the mobile subscriber having the subscriber number A on the existing receipt processing. In the example of (1) in FIG. 8, the mobile subscriber having the subscriber number A is busy (B), so that the speech can not be made. In this case, an optional mobile subscriber having idle (I) in LM of the same group is searched by referring to the group number G.NO in the present invention (STEP S64) [referring to (2) in FIG. 8].

As the mobile subscriber having the subscriber number B is idle (I) in the example (2) in FIG. 8, the receipt number is changed from A to B (STEP S65). And then, it becomes possible to communicate by the receipt in the mobile subscriber having the subscriber number B according to the existing receipt processing (STEP S66). It is possible that another mobile subscriber in the group receives a call, even if the mobile subscriber of the representative master YP of the group is busy, so that the efficiency of receiving may be improved.

Further, in the above-described structure LM (showing whether it is idle (I) or busy (B)) in the subscriber data table 11 is set per a mobile subscriber, so that it is possible to receive a call directly, when the corresponding mobile subscriber is idle (I), even if the receipt is performed with the subscriber number other than the mobile subscriber of the representative master YP of the group.

(SWITCHING CHANNEL)

In FIG. 2, as described above, a plurality of radio base stations BSi are provided in a cell field having one location number. And channel frequencies between at least the adjacent radio stations are different for preventing cross talk. Accordingly, it is required to switch the channel, in the case where the mobile subscriber is moved from one radio base station to the adjacent base station.

That is, processing is performed to switch a channel to the radio field where a stronger radio wave is obtained to keep the communication quality even during moving of the mobile subscriber, and the processing is called switching a channel.

Figures 9, 10A, 10B:
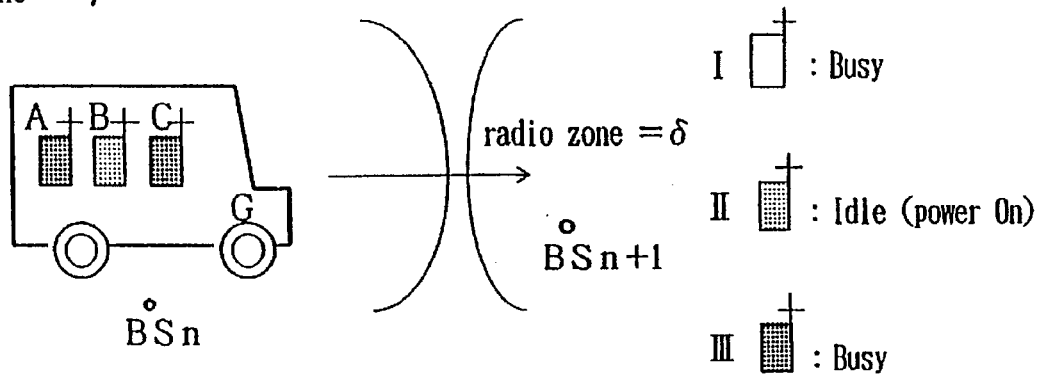
FIG. 9 is a diagram explaining an example in which the switching of a channel is performed according to the present invention.

More particularly, the present invention has such a characteristic as switching a channel which is performed in the case where plural mobile subscribers move to the same area as a group. FIG. 9 is an explanation of switching channel in the case where plural mobile subscribers move to the same area as a group.

Figure 11:
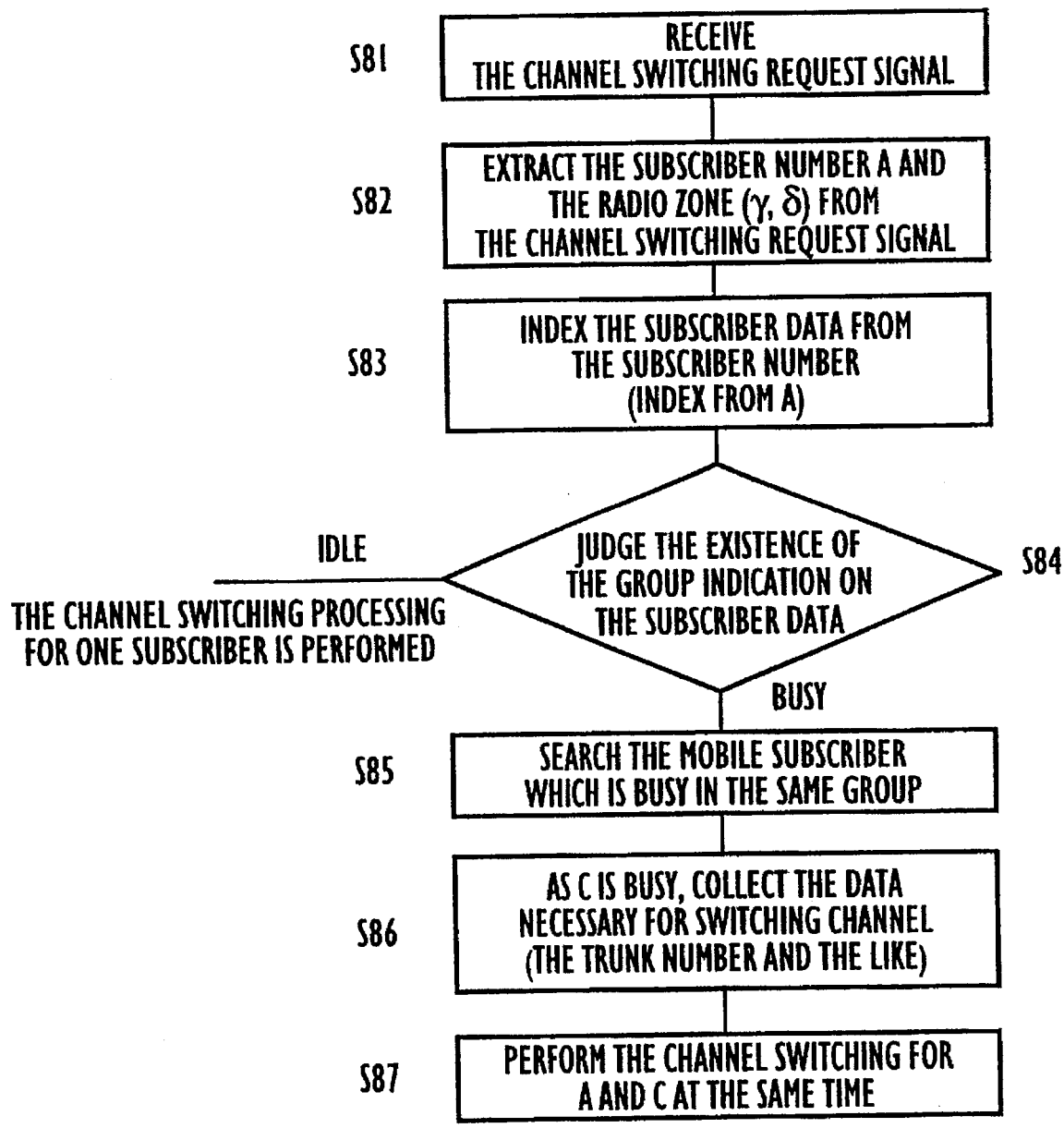
FIG. 11 is a flow chart showing a method for switching channel.

Further, FIG. 11 is a processing flow chart for switching a channel to obtain communication during movement of the mobile subscribers and FIG. 10 is a diagram for explaining the contents of the subscriber data table 11 corresponding to said processing flow chart. Further, the operation shown by the processing flow chart in FIG. 11 is also performed under control of CPU 10 of the mobile switch center 1.

In FIG. 9, it is shown that the mobile subscribers A, B and C constituting a group move from the radio zone γ of the radio base station BSn to the radio zone δ of $BS_{n+1}$. Then, as shown in FIG. 9, the mobile subscribers A and C are busy (B) and the mobile subscriber B is idle (I).

The radio base station $BS_n$ allocates a channel for the mobile subscriber A, so that the telephone talk with the mobile subscriber A can be performed. Supposing that the mobile subscriber A moves from the radio zone γ to δ, the radio base station $BS_n$ detects the inferior of the sending/receiving signal level with the mobile subscriber A, that is, the inferior of the condition of radio wave. This detecting function provided on the radio base station $BS_n$ is conventional.

Accordingly, when the inferior of this signal sending/receiving level is detected, the radio base station $BS_n$ sends a channel switching request signal to the mobile switch center 1 and the movable switch center 1 receives this signal (STEP S81). And then, the subscriber number A and the radio zone (γ, δ) are extracted from the received channel switching request signal (STEP S82).

Further, the corresponding subscriber data table 11 is indexed from the extracted subscriber number A (STEP S83). Then, the indexed subscriber data table 11 is as described in (1) of FIG. 10. The existence of the group indication Y is judged from this subscriber data table 11 (STEP S84).

In the case where a group indication is not present, the conventional switching channel processing for one subscriber is performed. That is, switching is performed from the channel of $BS_n$ of the radio zone γ to that of $BS_{n+1}$ of the radio zone δ. On the other hand, in the case where the group indication Y exists, another mobile subscriber which is busy in the same group, that is, the allocated channel of the mobile subscriber C in the embodiment of (2) in FIG. 10 is switched to the channel of $BS_{n+1}$ of the radio zone δ according to the present invention.

For that reason, the mobile switch center 1 searches for the mobile subscriber which is busy in the same group (STEP S85). As the mobile subscriber C is busy, the data necessary for switching a channel, that is, the trunk number and the like are collected (STEP S86). As a result, the channel is switched to the channel of $BS_{n+1}$ for the movable subscriber C at the same time when the channel of the movable subscriber A is switched (STEP S87).

As described above, channel switching processing is performed for a mobile subscriber, the same channel switching is performed for all of other mobile subscribers which are busy and which are the members of the same group, in the case where any one of mobile subscribers in the group is busy and the channel switching processing is performed for the mobile subscriber, thus keeping the communication quality during the moving of the mobile subscriber.

As described above, the present invention brings the following effects;

First, when a location number of a mobile subscriber held by one subscriber in a group is registered, it is possible to register the same location number for all of other subscribers in the group, referring to the subscriber data table 11 on the mobile switch center 1, even if the mobile subscriber held by all other subscribers in the communication group is in the power OFF condition. Accordingly, the location information is obtained at all times.

As the location information of the mobile subscriber which does not advance the location number registration request can be changed, the opportunity for occupying the channel for sending and receiving the signal with the radio base station can be reduced and efficiency is increased in the whole system.

Further, when a mobile subscriber of the group is called, it becomes possible to send the call to any one of idle mobile telephones of the group according to dialling with the representative number only. Accordingly, the rate of completing receipt is improved and more particularly, urgent contact can be performed for the group, and thus a preferable condition is obtained for the system.

Furthermore, on switching a channel, the quality of subscriber speech can be improved, as it is possible to switch the channel with control by the switch center 1 for other mobile subscribers which are busy by using one channel switching request for any one of the mobile subscribers in the group.

What is claimed is:

1. A mobile telephone communication system accommodating a plurality of mobile subscribers and connected to a plurality of radio base stations, each mobile subscriber sending out information including at least a location number corresponding to a cell field in which a respective mobile subscriber is located, the system comprising:

a mobile switch center for receiving the information from each of the plurality of the mobile subscribers via a corresponding radio base station, registering a group indication that indicates mobile subscribers constituting a group, a group number corresponding to the group, and location numbers of a plurality of cell fields, in which the mobile subscribers are located, as subscriber data, and updating, upon occurrence of a change in registration of a location number for one mobile subscriber, the registration of the same location number as that of the one mobile subscriber for all remaining mobile subscribers which constitute a group with the one mobile subscriber, by referring to the group indication and the group number registered for the one mobile subscriber.

2. The mobile telephone communication system according to claim 1, wherein said occurrence of the change in registration for the one mobile subscriber is made under condition that the one mobile subscriber is in a state of power ON and idle, and moves from first one of the plurality of cell fields, having a first location number to second one of the plurality of the cell fields, having a second location number which is different from the first location number.

3. The mobile telephone communication system according to claim 2, wherein the mobile switch center registers the same location number as the second location number for all remaining mobile subscribers, when the second location number is registered for the one mobile subscribers.

4. The mobile telephone communication system according to claim 3, wherein said plurality of mobile subscribers are portable telephones or automobile telephones.

5. The mobile telephone communication system according to claim 2, wherein each of the plurality of cell fields has a corresponding location number and includes a plurality of radio zones.

6. The mobile telephone communication system according to claim 5, wherein said mobile switch center includes a subscriber data table which stores a condition of idle or busy for each mobile subscriber; and when one mobile subscriber of the group is busy and moves to a different radio zone, a communication channel corresponding to the different radio zone is switched at the same time to the one mobile subscriber and the remaining mobile subscribers of the same group, which are all busy, by referring to the group indication and the group number.

7. The mobile telephone communication system according to claim 6, wherein said plurality of mobile subscribers are portable telephones or automobile telephones.

8. The mobile telephone communication system according to claim 5, wherein said plurality of mobile subscribers are portable telephones or automobile telephones.

9. The mobile telephone communication system according to claim 2, wherein said plurality of mobile subscribers are portable telephones or automobile telephones.

10. The mobile telephone communication system according to claim 1;

wherein the group indication includes information for identifying a mobile representative master and mobile subordinates of the group of said mobile subscribers constituting the group;

and wherein the mobile switch center includes a subscriber data table which stores an indication showing a state of idle or busy for each of the mobile subscribers constituting the group; and wherein a call for the group from a mobile subscriber is sent by using a telephone number of the representative master and the call is received by any of the subordinates, which is identified as idle according to the content of the subscriber data table, when the representative master is busy.

11. The mobile telephone communication system according to claim 10, wherein said plurality of mobile subscribers are portable telephones or automobile telephones.

12. The mobile telephone communication system according to claim 1, wherein said plurality of mobile subscribers are portable telephones or automobile telephones.

13. A mobile switch center for use in a mobile telephone communication system, connected to a plurality of cell radio base stations each communicating with mobile telephones within a corresponding cell field, the mobile switch center comprising:

a subscriber telephone data table for storing a group indication that indicates mobile telephones constituting a group and a group number corresponding to the group as telephone data; and a central processor unit for receiving information of location numbers from mobile telephones via respective cell radio base stations, and performing, upon occurrence of a change in registration of a location number for one mobile telephone, the registration of the same location number for all remaining mobile telephones in the group, by referring to the group indication and the group number.

14. The mobile telephone communication system according to claim 13, wherein each of of plurality of cell fields has a corresponding location number.

15. The mobile switch center according to claim 14, wherein said occurrence of change in registration of a location number for the one mobile subscriber is made under condition that the one mobile subscriber is in a state of power ON and idle, and moves to a first one of a plurality of cell fields, having a first location number to a second one of the plurality of the cell fields, having a second location number which is different from the first location number, and the mobile switch center registers the same location number as the second location number for all remaining mobile subscribers when the second location number is registered for the one mobile subscriber.

16. The mobile switch center according to claim 16, wherein:

the group indication includes information for identifying a representative master and subordinates of the group constituted by said mobile telephones;

the telephone data table stores an indication showing a state of idle or busy for each of the mobile telephones constituting the group; and a call for the group from a mobile telephone is sent by using the telephone number of the representative master and the call is received by any of the subordinates, which is identified as idle according to the content of the telephone data table, when the representative master is busy.

17. The mobile switch center according to claim 15, wherein said telephone data table of the mobile switch center further stores a condition of idle or busy for each mobile telephone; and when one mobile telephone of the group is busy and moves to a different radio zone within a respective cell field, a communication channel corresponding to the different radio zone is switched at the same time to the one mobile telephone and the remaining mobile telephones of the same group, which are all busy, by referring to the group indication and the group number.

* * * * *